United States Patent
Hermann

[11] 3,891,161
[45] June 24, 1975

[54] OPTICAL POSITION DETERMINING DEVICE FOR CONTROLLING A SPIN STABILIZED FLYING BODY

[75] Inventor: Joachim Hermann, Munich, Germany

[73] Assignee: Bolkow Gesellschaft mit beschrankter Haftung, Germany

[22] Filed: June 14, 1965

[21] Appl. No.: 464,270

[30] Foreign Application Priority Data
June 19, 1964 Germany.................................. 77311

[52] U.S. Cl............................... 244/3.12; 244/3.14
[51] Int. Cl............................................. F42b 15/04
[58] Field of Search ........ 244/3.11, 3.12, 3.13, 3.14, 244/3.22, 3.16; 250/88.3 IR, 203; 102/70.2

[56] References Cited
UNITED STATES PATENTS
3,090,582  5/1963  Senger .............................. 244/3.12
3,098,933  7/1963  Barasch ......................... 244/3.14 X

*Primary Examiner*—Verlin R. Pendegrass
*Attorney, Agent, or Firm*—Toren, McGeady and Stanger

EXEMPLARY CLAIM

1. In an optical position determining device controlling a spin stabilized flying body having electrical launch-initiating ignition means and a radiator to whose radiation the position determining device is responsive, the position determining device including an adjustable speed motor rotating its image field scanning means: apparatus for synchronizing the image field scanning with the spin of the flying body comprising, in combination, an ignition current circuit for said ignition means; switch means controlling closure of said circuit; and triggering means periodically operable by said motor at a rate corresponding to the motor speed, and controlling said switch means in a manner such that said flying body, when launched, spins about its longitudinal axis with an angular velocity equal to that of said scanning means and with a predetermined phase relation to the latter.

6 Claims, 1 Drawing Figure

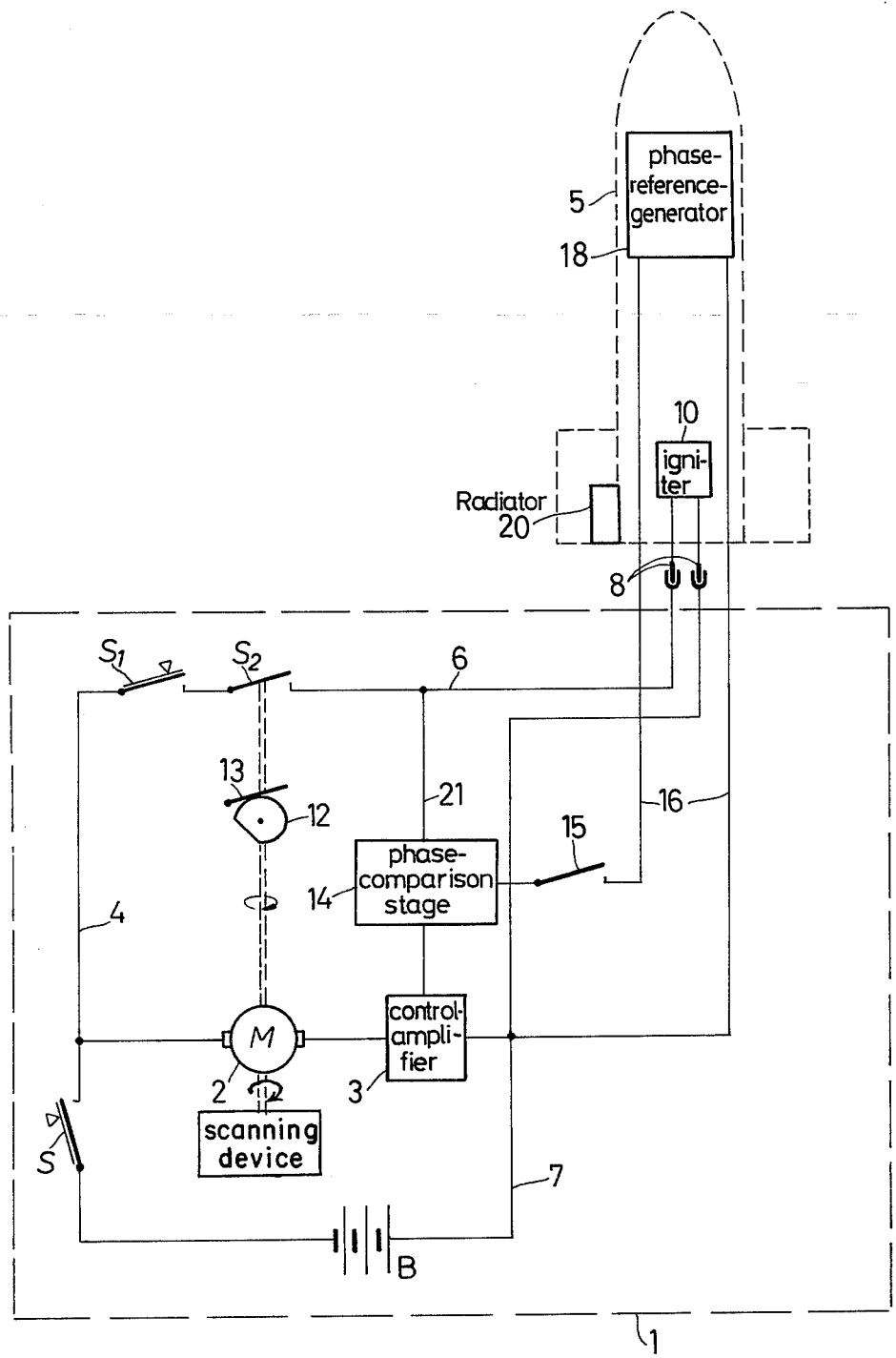

OPTICAL POSITION DETERMINING DEVICE FOR CONTROLLING A SPIN STABILIZED FLYING BODY

This invention relates to the control of spin stabilized flying bodies and, more particularly, to a novel arrangement for the synchronization of the image field sensing of an optical position determining device with a spin stabilized flying body carrying a radiation device to which the position determining arrangement is responsive.

As is known to those skilled in the art, optical position determining or tracking devices serve to indicate the angular deviation, relative to a reference direction, of an object appearing in the image field of the position determining or tracking device.

In the type of optical position determining device to which the present invention is directed, the image field is sensed by means of a rotating diaphragm driven by an adjustable speed motor. For example, this diaphragm may have a number of equidistant radial spokes. In accordance with the rotating optical image or picture of an object within the image field of the position determining device, a transducer located behind the diaphragm supplies a pulsating electric potential whose frequency remains constant when the image circle is concentric, but whose frequency changes when the image circle is eccentric.

When the image circle is concentric, the object observed by the position determining device is situated within the reference direction. On the other hand, when the image circle is eccentric, the observed object is outside the reference direction of the position determining device. The change in frequency of the pulsating voltage or potential is approximately proportional to the angular deviation of the object being tracked.

If the object to be tracked is a spin stabilized flying body which is to be guided toward a target by guide signals or commands fed to the flying body, then the reference systems of the flying body and of the position determining device must constantly coincide. Otherwise, a guide signal or command, dependent upon a deviation of the flying body from the reference direction, as ascertained by the position determining device, would cause a false reaction of the flying body. In order to obtain such coincidence, care must be exercised that the angular velocity of the image field sensing must be equal to the angular velocity of the flying body, and that the image field sensing has a constant phase relation with the spin of the flying body.

In a known arrangement, such equalization of the two angular velocities and obtaining of the constant phase relation therebetween is effected by conjointly accellerating the flying body and the diaphragm of the optical position determining means prior to the launching of the flying body. Through a comparison device, the angular velocities of the flying body and of the diaphragm are equalized. During the flight of the flying body such equalization is maintained constantly, as by means of phase comparison devices in the flying body acting in conjunction with control devices in the position determining means.

An object of the present invention is to provide a simpler arrangement for obtaining such equalization of the angular velocities and such constant phase relation, and which is not only completely reliable but also becomes active at a much faster rate.

In a flying body of the mentioned type, the spin is provided by appropriately directed nozzles of a reaction engine. This flying body is launched from a launching pad which is in relatively close proximity to the position determining device.

Accordingly, another object of the invention is to provide a simpler device for attaining equalization of the angular velocities of the flying body and of the diaphragm of the position determining device, and a constant phase relation thereof, by providing, in the ignition current circuit of the flying body, a synchronization contact or switch which is operated by the motor driving the sensing device in such a manner that the flying body, upon leaving its launching pad, rotates, in synchronism with the sensing device, about its longitudinal axis, and in a predetermined phase relation with the sensing device.

A further object of the invention is to provide a simpler synchronization and phase relation maintaining device of the mentioned type in which no special synchronization devices for the launching phase of the flying body are necessary.

Yet another object of the invention is to provide a speed synchronization and phase relation maintaining arrangement for a flying body with respect to an optical position determining device, and in which the phase comparison means of the position determining device, which is connected with a phase reference generator in the flying body, is controlled by synchronization pulses generated by a synchronization contact or switch.

Still a further object of the invention is to provide an arrangement of the type just mentioned in which, after launching of the flying body, such pulses maintain the position determining device in synchronism with the spin of the flying body.

Another object of the invention is to provide an arrangement of the type just mentioned in which the synchronization contact in the igniting current circuit of the flying body is operated by an adjustable cam on the shaft of the motor rotating the diaphragm.

A further object of the invention is to provide an arrangement of the type mentioned in which the synchronization switching in the igniting current circuit of the flying body is effected by known electro-optical switching devices.

Another object of the invention is to provide an arrangement of the type mentioned in which the synchronization switching of the ignition current circuit of the flying body is effected by a diaphragm on the shaft of the motor rotating the sensing diagram, or by an optically treated area on such motor shaft, in cooperation with an electro-optical control member operatively associated with a light source.

For an understanding of the principles of the invention, reference is made to the following description of a typical embodiment thereof as illustrated in the accompanying drawing.

In the drawing, the single FIGURE is a schematic diagram of an embodiment of the invention, in which all those portions of an optical position determining device not having a direct functional association with the invention have been omitted for the sake of simplicity.

Referring to the drawing, an optical position determining device 1 is illustrated as including a motor 2, which drives a diaphragm (not shown) effecting the image field sensing or scanning. Motor 2 is an adjustable speed motor whose speed is controlled by means of a control amplifier 3. The operating potential of motor 2 is supplied from a battery B through a main switch S. The battery potential is also supplied to the igniter 10 of a flying body 5 through a line 4, a launching switch $S_1$ for the body 5, a synchronization switch $S_2$, lines 6 and 7, and detachable plug connections 8. A cam 12 is angularly adjustable on the motor shaft connected to the mentioned diaphragm, and cam 12 operates synchronization switch $S_2$ through a pivoted lever type of cam follower 13.

A phase comparison circuit or means 14 is connected between control amplifier 3 and line 6. Phase comparison means 14 is also connected, through a switch 15 and lines 16, with a phase reference generator 18 situated in the flying body. This connection between phase reference generator 18 and phase comparison means 14 is maintained constantly, even during flight of the flying body.

The arrangement shown in the drawing operates in the following manner: When main switch S is closed, motor 2 is energized to rotate the field sensing or scanning diaphragm. Through the medium of control amplifier 3, motor 2 is brought up to a preselected speed. The flying body 5, connected to the position determining device 1 through line connections 16 and through the plug contacts 8, may now be launched by closing launching switch $S_1$.

However, the closing of switch S merely prepares the current supply circuit for the igniter 10 of the flying body. Ignition of the engine (not shown) of the flying body occurs only after synchronization switch $S_2$ is closed by cam 12 rotating synchronously with the image field sensing or scanning. In this manner, the launching of flying body 5 occurs with a definite and always constant phase relationship to the phase position of the image field sensing.

switching cam 12 is adjusted, relative to the image field sensing, in accordance with the initial start-up procedure of the flying body 5, and which procedure can be predetermined. The adjustment of cam 12 is effected in such a manner that, at the time the flying body leaves its launching pad, phase synchronization between the spin of the flying body and the image field sensing of the position determining device can be expected.

When flying body 5 leaves its launching pad, it closes, in a manner which has not been illustrated, switch 15 which connects phase reference generator 18 of flying body 5 with phase comparison device 14 of position determining means 1, through lines 16. Phase comparison means 14 then maintains phase synchronization between the spin stabilized flying body and the image field sensing. This is effected responsive to radiation received by position determining device 1 and which emanates from a radiator or radiation device 20 associated with flying body 5. For this purpose, phase comparison circuit 14 is supplied, through line 21, with pulses corresponding to the operation of the synchronization contact $S_2$. At the same time, plug contact connections 8 are broken so that back reactions through the ignition circuit cannot occur.

In the illustrated embodiment, initiation of the spin of flying body 5 is effected by pyrotechnical means. In such an arrangement, only the front flanks of the synchronization pulses of synchronization contact or switch $S_2$ are of importance for the pyrotechnical ignition. The rear pulses of the flanks, and particularly the lengths or periods of the pulses, may be adapted to their respective requirements by suitable construction of switching cam 12.

The triggering device may also be controlled magnetically, for example by rotating a permanent magnet or magnet diaphragm positioned between the triggering magnet and the sensing device and which may, for example, be a coil or winding of a Hall generator.

While a specific embodiment of the invention has been shown and described in detail to illustrate the application of the principles of the invention, it should be understood that the invention may be embodied otherwise without departing from such principles.

What is claimed is:

1. In an optical position determining device controlling a spin stabilized flying body having electrical launch-initiating ignition means and a radiator to whose radiation the position determining device is responsive, the position determining device including an adjustable speed motor rotating its image field scanning means: apparatus for synchronizing the image field scanning with the spin of the flying body comprising, in combination, an ignition current circuit for said ignition means; switch means controlling closure of said circuit; and triggering means periodically operable by said motor at a rate corresponding to the motor speed, anad controlling said switch means in a manner such that said flying body, when launched, spins about its longitudinal axis with an angular velocity equal to that of said scanning means and with a predetermined phase relation to the latter.

2. In an optical position determining device controlling a spin stabilized flying body having electrical launch-initiating ignition means, a radiator to whose radiation the position determining device is responsive, and a phase reference generator, the position determining device including an adjustable speed motor rotating its image field scanning means and a phase comparison circuit having an input connected to the phase reference generator: apparatus for synchronizing the image field scanning means with the spin of the flying body comprising, in combination, an ignition current circuit for said ignition means; switch means controlling closure of said circuit; triggering means periodically operable by said motor at a rate corresponding to the motor speed and periodically closing said switch means in a manner such that the flying body, when launched, spins about its longitudinal axis with an angular velocity equal to that of said scanning means and with a predetermined phase relation to the latter; means for applying pulses, generated by said switch means, to another input to said phase comparison circuit; and motor speed control means connected to the output of said phase comparison circuit and to said motor and controlling the speed of said motor, in accordance with a comparison of the signals at the inputs of said phase comparison circuit, to maintain synchronism between the image field scanning means and the spin of the flying body after launching of the flying body.

3. In an optical position determining device controlling a spin stabilized flying body having electrical launch-initiating ignition means and a radiator to whose radiation the position determining device is responsive, the position determining device including an adjustable speed motor rotating its image field scanning means: apparatus for synchronizing the image field scanning with the spin of the flying body comprising, in combination, an ignition current circuit for said ignition means; switch means controlling closure of said circuit; and triggering means periodically operable by said motor at a rate corresponding to the motor speed, and controlling said switch means in a manner such that said flying body, when launched, spins about its longitudinal axis with an angular velocity equal to that of said scanning means and with a predetermined phase relation to the latter; said switch means comprising a switch in said ignition current circuit, and said triggering means comprising a cam on the motor shaft rotating the image field scanning means.

4. In an optical position determining device controlling a spin stabilized flying body having electrical launch-initiating ignition means and a radiator to whose radiation the position determining device is responsive, the position determining device including an adjustable speed motor rotating its image field scanning means: apparatus for synchronizing the image field scanning with the spin of the flying body comprising, in combination, an ignition current circuit for said ignition means; switch means controlling closure of said circuit; and triggering means periodically operable by said motor at a rate corresponding to the motor speed, and controlling said switch means in a manner such that said flying body, when launched, spins about its longitudinal axis with an angular velocity equal to that of said scanning means and with a predetermined phase relation to the latter; said switch means comprising a switch in said ignition current circuit, and said triggering means comprising a cam angularly adjustably mounted on a motor shaft rotating the image field scanning means.

5. In an optical position determining device controlling a spin stabilized flying body having electrical launch-initiating ignition means, a radiator to whose radiation the position determining device is responsive, and a phase reference generator, the position determining device including an adjustable speed motor rotating its image field scanning means and a phase comparison circuit having an input connected to the phase reference generator: apparatus for synchronizing the image field scanning means with the spin of the flying body comprising, in combination an ignition current circuit for said ignition means; switch means controlling closure of said circuit; triggering means periodically operable by said motor at a rate corresponding to the motor speed and periodically closing said switch means in a manner such that the flying body, when launched, spins about its longitudinal axis with an angular velocity equal to that of said scanning means and with a predetermined phase relation to the latter; means for applying pulses, generated by said switch means, to another input of said phase comparison circuit; and the motor speed control means connected to the output of said phase comparison circuit and to said motor and controlling the speed of said motor, in accordance with the comparison of the signals at the inputs of said phase comparison circuit, to maintain synchronism between the image field scanning means and the spin of the flying body after launching of the flying body; said switch means comprising a switch in said ignition current circuit, and said triggering means comprising a cam on the motor shaft rotating the image field scanning means.

6. In an optical position determining device controlling a spin stabilized flying body having electrical launch-initiating ignition means, a radiator to whose radiation the position determining device is responsive, and a phase reference generator, the position determining device including an adjustable speed motor rotating its image field scanning means and a phase comparison circuit having an input connected to the phase reference generator: apparatus for synchronizing the image field scanning means with the spin of the flying body comprising, in combination, an ignition current circuit for said ignition means; switch means controlling closure of said circuit; triggering means periodically operable by said motor at a rate corresponding to the motor speed and periodically closing said switch means in a manner such that the flying body, when launched, spins about its longitudinal axis with an angular velocity equal to that of said scanning means and with a predetermined phase relation to the latter; means for applying pulses, generated by said switch means, to another input of said phase comparison circuit; and motor speed control means connected to the output of said phase comparison circuit and to said motor and controlling the speed of said motor, in accordance with the comparison of the signals at the inputs of said phase comparison circuit, to maintain synchronism between the image field scanning means and the spin of the flying body after launching of the flying body; said switch means comprising a switch in said ignition current circuit, and said triggering means comprising a cam angularly adjustably mounted on a motor shaft rotating the image field scanning means.

* * * * *